United States Patent [19]

Ando et al.

[11] Patent Number: 4,720,471

[45] Date of Patent: * Jan. 19, 1988

[54] ALUMINA PORCELAIN COMPOSITIONS

[75] Inventors: Minato Ando; Masaaki Ito; Fumio Mizuno, all of Aichi, Japan

[73] Assignee: NGK Spark Plug Co., Ltd., Aichi, Japan

[*] Notice: The portion of the term of this patent subsequent to Feb. 17, 2004 has been disclaimed.

[21] Appl. No.: 824,472

[22] Filed: Jan. 31, 1986

[30] Foreign Application Priority Data

Jan. 31, 1985 [JP] Japan .................. 60-17564

[51] Int. Cl.$^4$ .................. C04B 35/10; C04B 35/46
[52] U.S. Cl. .................. 501/136; 501/153
[58] Field of Search .................. 501/127, 153, 136

[56] References Cited

U.S. PATENT DOCUMENTS 3,615,307 10/1971 Jones .................. 501/135 X
4,177,235 12/1979 Neidhardt et al. .................. 501/153 X
4,430,440 2/1984 Wada et al. .................. 501/104 X
4,542,111 9/1985 Buran et al. .................. 501/153 X

FOREIGN PATENT DOCUMENTS 56-46502 4/1981 Japan .................. 501/135
56-73665 6/1981 Japan .................. 501/135
60-176966 9/1985 Japan .................. 501/153
60-176967 9/1985 Japan .................. 501/153

Primary Examiner—Mark L. Bell
Assistant Examiner—A. Knab
Attorney, Agent, or Firm—Sughrue, Mion, Zinn, Macpeak & Seas

[57] ABSTRACT

A sintered alumina porcelain composition is described consisting of a ternary composition consisting of from 96 to 99 mol % of $Al_2O_3$ and the remainder consisting of CaO and $TiO_2$ present in a $CaO/TiO_2$ molar ratio of from 0.8/1 to 1.1/1 and $SiO_2$, wherein based on 100 parts by weight of the ternary $Al_2O_3$—CaO—$TiO_2$ composition, $SiO_2$ is present in an amount within the range defined by the area within the straight lines connecting points A-B-C-D-E-F-A in the composition diagram set forth in the attached drawing for describing the relationship between the $SiO_2$ content and the $Al_2O_3$ molar ratio, provided that point A is excluded from the range of the $SiO_2$ content, with said points having the following locations:

|  | $SiO_2$ (parts by weight) | $Al_2O_3$ (mol %) |
|---|---|---|
| Point A | 0 | 96 |
| Point B | 0.01 | 98 |
| Point C | 0.03 | 99 |
| Point D | 1.20 | 99 |
| Point E | 0.48 | 98 |
| Point F | 0.14 | 96 |

1 Claim, 1 Drawing Figure

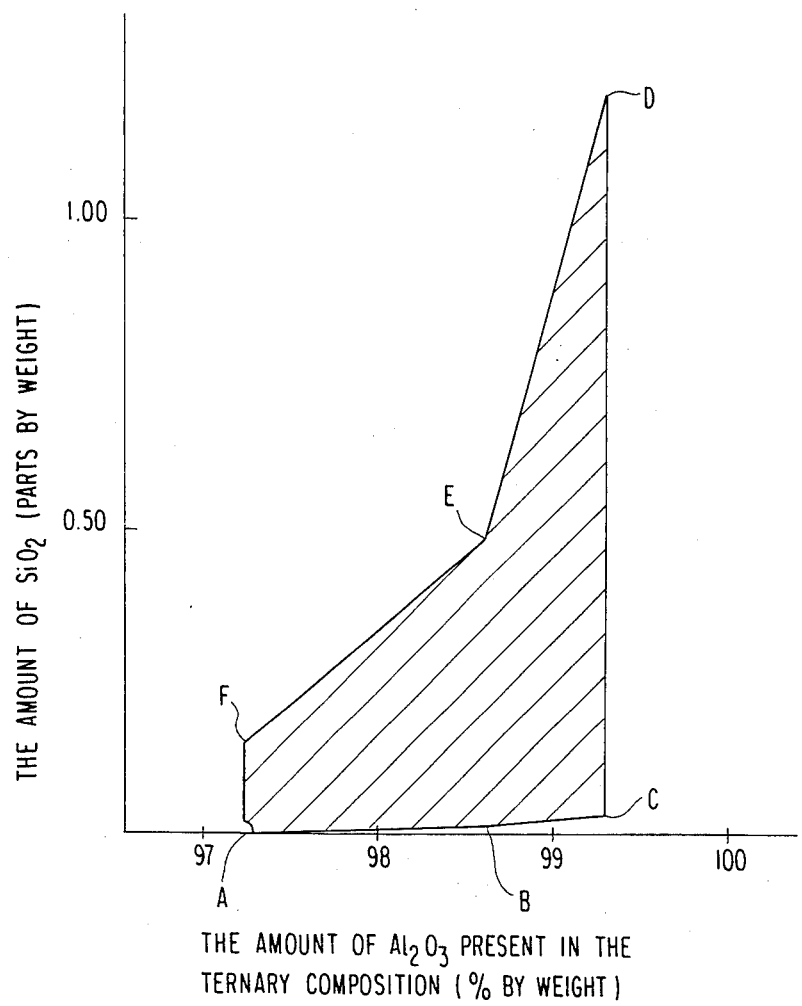

ALUMINA PORCELAIN COMPOSITIONS

FIELD OF THE INVENTION

The present invention relates to an alumina porcelain composition useful in communications equipment (e.g., dielectric resonators, bases for microwave integrated circuits, microwave transmission windows, and antenna dielectrics) that requires the use of materials undergoing small high frequency dielectric loss.

BACKGROUND OF THE INVENTION

A dielectric porcelain material which is included within the general category of compositions as described above is disclosed in the specification of Japanese Patent Application No. 32113/84 (corresponding to Japanese Patent Application (OPI) No. 176967/85 (the term "OPI" as used herein refers to a "published unexamined Japanese patent application")) filed by the same assignee as that of the present application. The material proposed by this prior application is an alumina porcelain having the composition within the region surrounded by the straight lines connecting the points A-B-C-D-A in ternary composition diagram for $Al_2O_3$—CaO—$TiO_2$, with said points having the following locations:

|  | $Al_2O_3$ | CaO | $TiO_2$ |
| --- | --- | --- | --- |
| Point A | 0.94 | 0.04 | 0.02 |
| Point B | 0.81 | 0.14 | 0.05 |
| Point C | 0.81 | 0.02 | 0.17 |
| Point D | 0.94 | 0.01 | 0.05 |

(unit: molar fraction)

The $Al_2O_3$ content of this composition is limited to no more than 94 mol%, and this is because CaO and $TiO_2$, the unreacted forms of which are necessary for ensuring the required amount of calcium titanate, must be present in slightly excess amounts.

It has, however, been found that in the composition disclosed in Japanese Patent Application No. 32113/84, unreacted CaO or $TiO_2$ tends to react with $Al_2O_3$ to cause an abnormal growth of its crystal grains or to form an unknown material at the grain boundaries, which deteriorates the electrical properties of the composition.

SUMMARY OF THE INVENTION

A primary object, therefore, of the present invention is to provide a high frequency dielectric porcelain material that is free from the aforementioned problems and which has superior electrical, physical, mechanical, and chemical properties.

This object can be attained by a sintered alumina porcelain composition consisting of a ternary composition consisting of from 96 to 99 mol% of $Al_2O_3$ and the remainder consisting of CaO and $TiO_2$ present in a $CaO/TiO_2$ molar ratio of from 0.8/1 to 1.1/1 and $SiO_2$, wherein based on 100 parts by weight of the ternary $Al_2O_3$—CaO—$TiO_2$ composition, $SiO_2$ is present in an amount within the range defined by the area defined by the straight lines connecting points A-B-C-D-E-F-A in the composition diagram set forth in the attached drawing showing the relationship between the $SiO_2$ content and the $Al_2O_3$ molar ratio, provided that point A is excluded from the range of the $SiO_2$ content, with said points having the following locations:

|  | $SiO_2$ (parts by weight) | $Al_2O_3$ (mol %) |
| --- | --- | --- |
| Point A | 0 | 96 |
| Point B | 0.01 | 98 |
| Point C | 0.03 | 99 |
| Point D | 1.20 | 99 |
| Point E | 0.48 | 98 |
| Point F | 0.14 | 96 |

The alumina porcelain composition when converted from mol% to weight % consists of from 97.2 to 99.3% by weight of $Al_2O_3$ and the remainder consisting of CaO and $TiO_2$ present in a $CaO/TiO_2$ weight ratio of from 0.55/1 to 0.77/1 and $SiO_2$, wherein based on 100 parts by weight of the ternary $Al_2O_3$—CaO—$TiO_2$ composition, $SiO_2$ is present in an amount within the range defined by the area defined by the straight lines connecting points A-B-C-D-E-F-A in the composition diagram set forth in the attached drawing showing the relationship between the $SiO_2$ content and the $Al_2O_3$ weight ratio, provided that point A is excluded from the range of the $SiO_2$ content, with said points having the following locations:

|  | $SiO_2$ (parts by weight) | $Al_2O_3$ (% by weight) |
| --- | --- | --- |
| Point A | 0 | 97.2 |
| Point B | 0.01 | 98.6 |
| Point C | 0.03 | 99.3 |
| Point D | 1.20 | 99.3 |
| Point E | 0.48 | 98.6 |
| Point F | 0.14 | 97.2 |

BRIEF DESCRIPTION OF THE DRAWING

The drawing is a diagram showing the relationship between the amount of $SiO_2$ per 100 parts by weight of a ternary $Al_2O_3$—CaO—$TiO_2$ composition and the weight percent of $Al_2O_3$ present in said ternary composition.

DETAILED DESCRIPTION OF THE INVENTION

By incorporating $SiO_2$ in an amount that satisfies the aforementioned relationship, the following advantages will result:

(a) abnormal growth of the alumina crystal grains is inhibited;

(b) the temperature coefficient of resonance frequency ($\tau f$) having an absolute value of 20 or below is obtained; and (c) a dielectric power factor (tan $\delta$) of no more than $10 \times 10^{-5}$ is attained.

The present invention is explained in further detail, but without limitation, by referring to the following example.

EXAMPLE

Sample pieces No. 1 to No. 30 were prepared by the following procedures: alumina (AKP-HP of Sumitomo Chemical Co., Ltd.), calcium carbonate (high grade reagent, Hayashi Junyaku K.K.) and titanium dioxide (high grade reagent, Hayashi Junyaku K.K.; 95% rutile) were compounded in the molar ratios shown in Table 1 in terms of oxide; 100 parts by weight of the compounded composition was mixed with silicic anhydride (high grade reagent, Hayashi Junyaku K.K.) in the amounts indicated in Table 1 to make a total of 500 g; after addition of 10 g of hydroxypropyl cellulose, 5 g of polyethylene glycol and 350 g of demineralized water (99.995 wt% pure), the mixture was placed in a polyethylene vessel with an inner volume of 1,000 ml; the mixture was wet-blended by grinding with 700 g of alumina flint pebbles (20 mm mean diameter) at 120 rpm for 50 hours; the resulting slurry was lyophilized, sieved through a 60-mesh screen, press-formed at a pressure of 1,500 kg/cm$^2$, fired at from 1,380° to 1,450° C. for 1 hour, polished to provide a mirror surface, cleaned and dried to provide a cylindrically shaped sample measuring 16.0 mm diameter×8.0 mm length and having smoothness values of 0.1s at both end surfaces and 0.3s at side surfaces.

Measurements of $\tau f$, tan $\delta$, and dielectric constant $\epsilon$ of each of the sample pieces thus prepared were conducted under the following conditions.

Measurement Conditions

Method: Dielectric column resonance method
Apparatus: Model 8410C network analyzer system, product of Yokogawa-Hewlett Packard, Ltd.
Frequency: 8.0 GHz While the invention has been described in detail and with reference to specific embodiments thereof, it will be apparent to one skilled in the art that various changes and modifications can be made therein without departing from the spirit and scope thereof.

What is claimed is:

1. A sintered alumina porcelain composition consisting of a ternary composition consisting of from 97.2 to 99.3% by weight of $Al_2O_3$ and the remainder consisting of CaO and $TiO_2$ present in a CaO/$TiO_2$ weight ratio of from 0.55/1 to 0.77/1 and $SiO_2$, wherein based on 100 parts by weight of the ternary $Al_2O_3$—CaO—$TiO_2$ composition, $SiO_2$ is present in an amount within the range defined by the area defined by the straight lines connecting points A-B-C-D-E-F-A in the composition diagram set forth in the attached drawing showing the relationship between the $SiO_2$ content and the $Al_2O_3$ content, provided that point A is excluded from the range of the $SiO_2$ content, with said points having the following location:

| | $SiO_2$ (parts by weight) | $Al_2O_3$ (% by weight) |
|---|---|---|
| Point A | 0 | 97.2 |
| Point B | 0.01 | 98.6 |
| Point C | 0.03 | 99.3 |
| Point D | 1.20 | 99.3 |
| Point E | 0.48 | 98.6 |
| Point F | 0.14 | 97.2 |

TABLE 1

| Sample No. | Composition (% by weight) $Al_2O_3$ | CaO | $TiO_2$ | $SiO_2$ (parts by wt) | $\tau f$ (ppm/°C.) | tan$\delta$ ($\times 10^{-5}$) | $\epsilon$ | Remarks |
|---|---|---|---|---|---|---|---|---|
| 1 | 96.06 | 1.62 | 2.32 | 0 | +32 | 17 | 11.6 | Outside* |
| 2 | " | " | " | 0.04 | +37 | 12 | 11.5 | " |
| 3 | " | " | " | 0.20 | +47 | 9 | 11.3 | " |
| 4 | 97.30 | 1.11 | 1.59 | 0 | +5 | 10 | 10.5 | " |
| 5 | " | " | " | 0.04 | +13 | 6.3 | 10.4 | Within** |
| 6 | " | " | " | 0.14 | +20 | 5.7 | 10.3 | " |
| 7 | " | " | " | 0.20 | +22 | 4.6 | 10.1 | Outside |
| 8 | 98.66 | 0.55 | 0.79 | 0 | −25 | 6.8 | 10.4 | " |
| 9 | " | " | " | 0.01 | −17 | 5.1 | 10.3 | Within |
| 10 | " | " | " | 0.05 | −9 | 4.6 | 10.3 | " |
| 11 | " | " | " | 0.12 | −1 | 3.4 | 10.2 | " |
| 12 | " | " | " | 0.24 | +9 | 2.7 | 10.0 | " |
| 13 | " | " | " | 0.48 | +19 | 1.8 | 9.9 | " |
| 14 | " | " | " | 0.60 | +22 | 1.5 | 9.8 | Outside |
| 15 | 99.33 | 0.28 | 0.39 | 0 | −40 | 5.1 | 10.0 | Outside |
| 16 | " | " | " | 0.03 | −20 | 4.7 | 10.0 | Within |
| 17 | " | " | " | 0.08 | −15 | 4.6 | 9.9 | " |
| 18 | " | " | " | 0.20 | −8 | 3.5 | 9.8 | " |
| 19 | " | " | " | 0.40 | −1 | 2.0 | 9.8 | " |
| 20 | " | " | " | 0.80 | +10 | 2.1 | 9.7 | " |
| 21 | " | " | " | 1.2 | +20 | 4.6 | 9.6 | " |
| 22 | " | " | " | 1.4 | +24 | 5.1 | 9.6 | Outside |
| 23 | 99.87 | 0.055 | 0.078 | 0 | −52 | 4.3 | 9.9 | " |
| 24 | " | " | " | 0.08 | −33 | 4.0 | 9.9 | " |
| 25 | " | " | " | 0.14 | −26 | 6.0 | 9.8 | " |
| 26 | " | " | " | 0.20 | −22 | 7.2 | 9.7 | " |
| 27 | " | " | " | 0.60 | +2 | 16 | 9.6 | " |
| 28 | 97.25 | 1.00 | 1.75 | 0.08 | +11 | 6.0 | 10.2 | Within |
| 29 | 98.67 | 0.57 | 0.76 | 0.10 | −5 | 5.1 | 10.0 | " |
| 30 | 99.32 | 0.25 | 0.43 | 0.70 | +7 | 2.9 | 9.6 | " |

Outside*: Samples outside the scope of the Invention. within**: Samples within the scope of the Invention.

As Table 1 shows, the sample pieces within the scope of the present invention had superior electrical properties.

In summary, the present invention provides a dielectric porcelain material that undergoes small high-frequency dielectric loss, and exhibits stable temperature characteristics.

* * * * *